(12) United States Patent
Reed et al.

(10) Patent No.: US 8,098,882 B2
(45) Date of Patent: Jan. 17, 2012

(54) PERCEPTABILITY MODEL APPLIED TO WATERMARK SIGNALS

(75) Inventors: Alastair M. Reed, Lake Oswego, OR (US); Eliot Rogers, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 228 days.

(21) Appl. No.: 12/057,745

(22) Filed: Mar. 28, 2008

(65) Prior Publication Data

US 2009/0087018 A1 Apr. 2, 2009

Related U.S. Application Data

(63) Continuation of application No. 10/826,970, filed on Apr. 15, 2004, now Pat. No. 7,352,878.

(60) Provisional application No. 60/480,993, filed on Jun. 23, 2003, provisional application No. 60/463,175, filed on Apr. 15, 2003.

(51) Int. Cl.
*G06K 9/00* (2006.01)
(52) U.S. Cl. .................................................. 382/100
(58) Field of Classification Search .................. None
See application file for complete search history.

(56) References Cited

U.S. PATENT DOCUMENTS

| 5,493,677 | A | * | 2/1996 | Balogh et al. ............ 382/305 |
| 5,530,759 | A | | 6/1996 | Braudaway |
| 5,544,255 | A | | 8/1996 | Smithies et al. |
| 5,568,555 | A | | 10/1996 | Shamir |
| 5,646,997 | A | | 7/1997 | Barton |
| 5,652,626 | A | | 7/1997 | Kawakami |
| 5,687,236 | A | | 11/1997 | Moskowitz |
| 5,721,788 | A | | 2/1998 | Powell |
| 5,724,425 | A | | 3/1998 | Chang et al. |
| 5,748,763 | A | | 5/1998 | Rhoads |
| 5,809,139 | A | | 9/1998 | Girod |
| 5,862,218 | A | | 1/1999 | Steinberg |
| 5,875,249 | A | | 2/1999 | Mintzer |
| 5,893,101 | A | | 4/1999 | Balogh et al. |
| 5,915,027 | A | | 6/1999 | Cox |
| 5,919,730 | A | | 7/1999 | Gasper et al. |
| 5,930,369 | A | | 7/1999 | Cox |
| 5,933,798 | A | | 8/1999 | Linnartz |
| 5,946,414 | A | | 8/1999 | Cass |
| 5,949,055 | A | | 9/1999 | Fleet |
| 5,960,081 | A | | 9/1999 | Vynne |

(Continued)

FOREIGN PATENT DOCUMENTS

EP 1137244 9/2001

(Continued)

OTHER PUBLICATIONS

U.S. Appl. No. 60/463,175, filed Apr. 15, 2003.

(Continued)

*Primary Examiner* — Daniel Mariam
*Assistant Examiner* — Elisa Rice

(57) ABSTRACT

This document relates generally to digital watermarking. One claim recites a method including: obtaining data representing visual media; determining a model through iteratively embedding a digital watermark signal in the data; and embedding the digital watermark signal in the data according to the model. The model maximizes robustness of the digital watermark signal while minimizing perceptibility of the digital watermark signal when the signal is embedded in the data. A new embedding form or embedding mask is created after each embedding iteration. Of course, other combinations are described and claimed as well.

19 Claims, 3 Drawing Sheets

U.S. PATENT DOCUMENTS

| | | | |
|---|---|---|---|
| 5,974,548 A | 10/1999 | Adams | |
| 6,104,812 A | 8/2000 | Koltai et al. | |
| 6,185,312 B1 | 2/2001 | Nakamura et al. | |
| 6,246,777 B1 | 6/2001 | Agarwal et al. | |
| 6,304,345 B1 | 10/2001 | Patton et al. | |
| 6,320,675 B1 | 11/2001 | Sakaki et al. | |
| 6,332,031 B1 | 12/2001 | Rhoads et al. | |
| 6,334,187 B1 | 12/2001 | Kadono | |
| 6,590,996 B1 | 7/2003 | Reed et al. | |
| 6,614,914 B1 | 9/2003 | Rhoads et al. | |
| 6,631,198 B1 | 10/2003 | Hannigan et al. | |
| 6,633,654 B2 | 10/2003 | Hannigan et al. | |
| 6,700,995 B2 | 3/2004 | Reed | |
| 6,738,495 B2 | 5/2004 | Rhoads et al. | |
| 7,006,662 B2 | 2/2006 | Alattar et al. | |
| 7,088,844 B2 | 8/2006 | Hannigan et al. | |
| 7,263,203 B2 | 8/2007 | Rhoads et al. | |
| 7,443,537 B2 | 10/2008 | Reed | |
| 7,668,334 B2 | 2/2010 | Reed et al. | |
| 7,796,826 B2 | 9/2010 | Rhoads et al. | |
| 2001/0030759 A1 | 10/2001 | Hayashi et al. | |
| 2001/0033674 A1 | 10/2001 | Chen et al. | |
| 2001/0052076 A1 | 12/2001 | Kadono | |
| 2001/0054150 A1* | 12/2001 | Levy | 713/176 |
| 2002/0018879 A1 | 2/2002 | Barnhart et al. | |
| 2002/0021824 A1* | 2/2002 | Reed et al. | 382/100 |
| 2002/0027612 A1 | 3/2002 | Brill et al. | |
| 2002/0031241 A1 | 3/2002 | Kawaguchi et al. | |
| 2002/0051560 A1 | 5/2002 | Donescu et al. | |
| 2002/0054356 A1 | 5/2002 | Kurita et al. | |
| 2002/0067844 A1 | 6/2002 | Reed et al. | |
| 2002/0090111 A1 | 7/2002 | Fukushima et al. | |
| 2002/0101597 A1 | 8/2002 | Hoover | |
| 2002/0105679 A1 | 8/2002 | Haynes | |
| 2004/0184369 A1 | 9/2004 | Herre et al. | |
| 2005/0134918 A1 | 6/2005 | Reed | |
| 2006/0039581 A1 | 2/2006 | Decker et al. | |
| 2007/0031000 A1 | 2/2007 | Rhoads et al. | |
| 2007/0053550 A1 | 3/2007 | Alattar et al. | |

FOREIGN PATENT DOCUMENTS

| | | |
|---|---|---|
| EP | 1220152 | 7/2002 |
| GB | 2360659 | 9/2001 |
| WO | WO99/35819 | 7/1999 |
| WO | WO01/08405 | 2/2001 |

OTHER PUBLICATIONS

U.S. Appl. No. 11/846,449, filed Aug. 28, 2007.
U.S. Appl. No. 11/564,225, filed Nov. 28, 2006.
U.S. Appl. No. 11/090,968, filed Mar. 23, 2005.
U.S. Appl. No. 12/105,647, filed Apr. 18, 2008.
Ruanaidh et al. Watermarking Digital Images for Copyright Protection, IEEE Image Signal Process, vol. 143, No. 4, Aug. 1996, pp. 250-256.
Fleet et al. "Embedding Invisible Information in Color Images", IEEE Int. Conf on Image Proc. Oct. 1997, vol. 1 pp. 532, 535.
Battiato et al. "Robust Watermarking for Images Based on Color Manipulation", Third Int. Image Hiding Workshop, 1999.
Bor et al. "Image Watermarking Using DCT Domain Constraints", IEEE 1996, pp. 231-234.
Non-Final Office Action on U.S. Appl. No. 10/826,970, mailed Apr. 19, 2007.
Notice of Allowance on U.S. Appl. No. 10/826,970, mailed Nov. 8, 2007.

* cited by examiner of the output device in the embedding process. For example, for audio content, the quality metric could be modeled with human auditory system models, such as the MPEG AAC (Advanced Audio Coding) psychoacoustic model.

PERCEPTABILITY MODEL APPLIED TO WATERMARK SIGNALS

RELATED APPLICATION DATA

This application is a continuation of U.S. patent application Ser. No. 10/826,970, filed Apr. 15, 2004 (U.S. Pat. No. 7,352,878), which claims the benefit of U.S. Provisional Patent Application Nos. 60/480,993, filed Jun. 23, 2003, and 60/463,175, filed Apr. 15, 2003. Each of the above patent documents is hereby incorporated by reference.

TECHNICAL FIELD

The invention relates to digital watermarking of visual and audio data.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,614,914 and 6,122,403, which are hereby incorporated by reference.

One challenge for watermarking visual media is maximizing the robustness, readability, and/or auxiliary information capacity of a digital watermark relative to a desired perceptual quality level. The digital watermark modifies the host image to embed auxiliary data, yet makes these changes using the assistance of human visual system modeling such that the changes are substantially imperceptible. While many have discussed perceptual image models that address this issue, several challenges remain, including effectively extending models beyond just luminance to address human perceptual models for colors, and addressing the impact of printing to the perceptual model.

This disclosure describes a method for digitally watermarking visual media taking into account a model of the rendering device, such as the printer or video display, to account for the effect of the rendering device on visibility of the digital watermark. In one implementation, a reference image and watermarked image are passed through a model of the rendering device and then to a perceptual quality metric to compute a visibility metric for the watermarked image relative to the reference. The digital watermarking process repeats this evaluation iteratively, while adjusting the embedding of the digital watermark to achieve a desired visual quality.

In the case where the rendering device is a printer, the model of the output device takes into account such effects as the blurring effect, the tonal compression effect, and/or the dot gain effect of the printing process for a particular printer and substrate on which the image is printed. A similar approach can be applied to display devices, such as video monitors, video projectors, high definition video monitors, Plasma displays, etc. to take into account a model of the rendering device. As such, the method applies to still images and video content.

The technique can also be applied to watermarked audio, where the rendering device produces audio output and the system includes a model of the rendering device as well as an audio quality metric.

In our implementation, we use the Watson metric as a visual quality metric, but other metrics may be used as well.

Further features will become apparent with reference to the following detailed description and accompanying drawings.

DETAILED DESCRIPTION

Introduction

Figure 1:
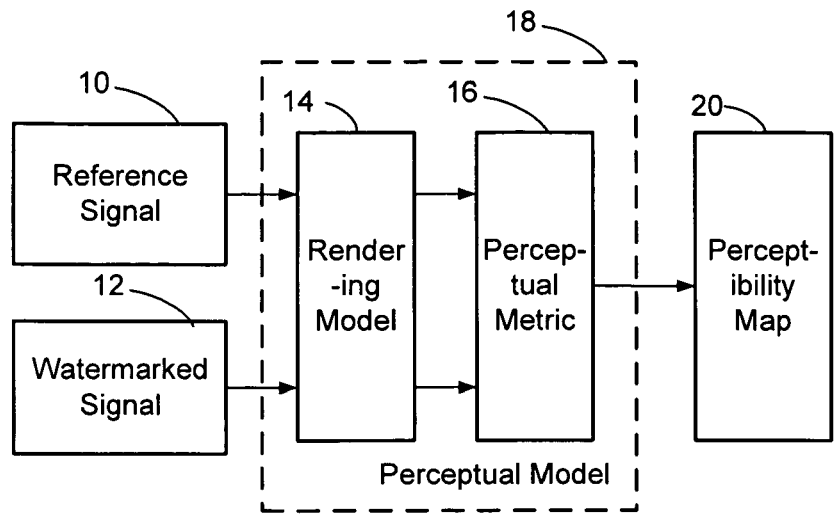
FIG. 1 is a diagram of a perceptual model used in a watermark embedder to compensate for the effect of the rendering device on perceptibility of a digital watermark.

We have developed a system for embedding digital watermarks in media content while taking into account the impact of the rendering device on the perceptibility of the watermark in output produced by that device. FIG. 1 is a diagram of a perceptual model used in a watermark embedder to compensate for the effect of the rendering device on perceptibility of a digital watermark. The perceptual model 18 receives reference and watermarked signals 10, 12. It then models the effect of the rendering device in a rendering model module 14. A perceptual metric module 16 then computes a perceptibility map 20 that is used to adjust the digital watermark selectively in areas of the watermarked signal that can tolerate more or less watermark signal strength for a desired amount of perceptibility. For example, the watermark signal strength can be maximized across the watermarked signal by varying it to maintain a desired perceptibility level as measured with the perceptibility metric.

In the following description, we focus on visual content and rendering of such content through printers or displays. Similar approaches can be used for audio content using human auditory system models and models of the rendering device (e.g., D/A conversion and speakers) to compensate for the effect of the rendering device on the perceptibility of the watermark.

Color Image Model for Rendering of Watermarked Visual Content

Perceptual models have been applied to the watermarking of still images. Many of these methods use luminance based models that do not take into account the reduced sensitivity of the eye to high spatial frequencies in the blue-yellow and red-green directions. Most of the models also ignore the effect of the output process on image quality. For example, in offset printing the same digital image will appear very different if it is printed on newsprint with a 85 line screen ruling, compared to printing on high quality gloss paper with a 150 line screen ruling. Similarly images and video appear different if rendered on different display devices such as projectors, televisions, computer monitors, etc. with different display formats and parameters.

To illustrate our method for offset printing, we describe a color image appearance model for Standard Web Offset Printing (SWOP) cyan, magenta, yellow, black (CMYK) data that is being watermarked. This model is used to calculate a grayscale visibility difference map. The visibility difference map is used to equalize the visibility of the watermark across the image, resulting in the maximum watermark signal at any visibility level.

This implementation of the color image appearance model is based on the Spatial CieLab and Watson metric, together with a model of the offset print process that is applied to the input images. Many factors affect the image quality of offset printed images. The major factors in offset printing that affect the watermark visibility are the paper stock and screen ruling. The model is used to automatically obtain the required visibility level for a watermark on characterized paper stocks and screen rulings.

Figure 2:
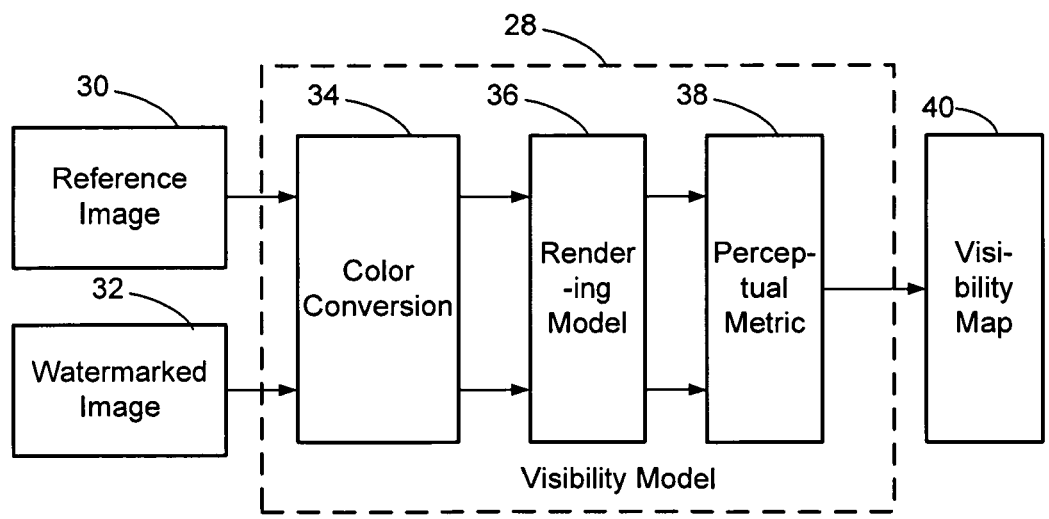
FIG. 2 is a diagram of a visibility model used in a watermark embedder to compensate for the effect of a printer on the perceptibility of a digital watermark.

FIG. 2 is a diagram of a visibility model used in a watermark embedder to compensate for the effect of a printing process on the perceptibility of a digital watermark. The visibility model 28 takes as input reference and watermarked images 30 and 32 and produces a visibility map used to adjust the watermarked image. The visibility model has three main components: color conversion module 34 (e.g., Spatial CieLab conversion) for converting the input images to a format for visibility analysis, a rendering device model 36 for modeling the effect of the rendering device, and a visibility metric module 38 (e.g., Watson metric) for computing a visibility metric for areas within the input images.

In one implementation, the reference and watermarked images 30, 32 are passed through a Spatial CieLab conversion going from CMYK to luminance. For more information on Spatial CieLab conversion, see Xuemei Zhang and Brian A. Wandell, 'A Spatial Extension of CieLab for Digital Color Image Reproduction', Proceedings of the SID Symposiums (1996). Alternative color conversion modules may be used. Also, if the visibility metric operates on color images, the input color images are converted to the color format used in the visibility metric module. For example, if the images are in CMYK format, they are converted to RGB format for a visibility metric module that operates on images in RGB format.

In the case of offset printing, the luminance images are passed through an offset print model to correct for paper type and screen ruling, and the two images are then compared in the Watson metric to produce an output visibility display map as a grayscale image. For more information on the Watson metric, see U.S. Pat. No. 5,629,780, which is hereby incorporated by reference.

The color image appearance model can be used iteratively within the watermark embedding software to obtain a marked image with the required level of visibility, on different types of print media from high quality offset on a heavy gloss paper stock to newsprint. The process of embedding a watermark in a CMYK image for print makes use of an original image along with a grayscale mask. Iterative embedding extends this by using the visibility map produced with the color image appearance model to create a new mask after each embedding iteration, as shown in FIG. 3.

Figure 3:
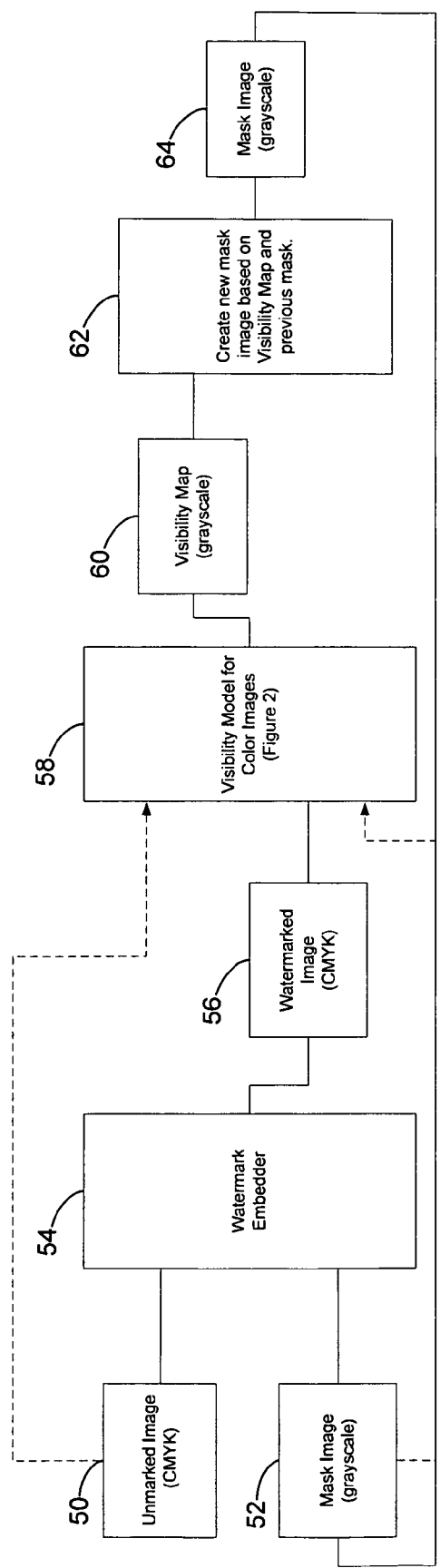
FIG. 3 is a diagram of an iterative embedding process using a visibility model that compensates for rendering effects to adjust the embedding strength in iterations of the embedding process.

FIG. 3 is a diagram of an iterative embedding process using a visibility model that compensates for rendering effects to adjust the embedding strength in iterations of the embedding process. The embedder 54 receives as input an original image 50 and a mask 52 used to control embedding strength in corresponding areas of the original image. It produces a watermarked image 56. As explained above, the visibility model 58 uses the original un-marked image 50 and the watermarked image 56 to produce a visibility map 60.

In the iterative process, areas of the mask are adjusted up and down based on the visibility map and the previous mask to change the amount of watermark signal being embedded in different parts of the image as shown in block 62 of FIG. 3. The new mask 64 is then fed back into the embedder 54 for the next embed. This continues until a visibility "goal" is reached, and the visibility map shows an even level of difference across the entire image.

The embedding software automatically determines the maximum watermark signal level that can be inserted while achieving the required visibility on these different media. The signal level is also adjusted to compensate for the different types of image content, and the effect of watermark resolution.

Figure 4:
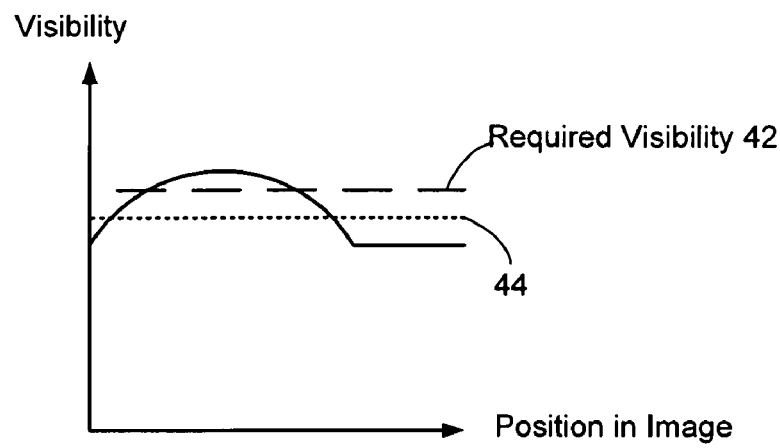
FIG. 4 is a plot illustrating an example of spatial visibility distribution used to illustrate how a visibility map can be used to adjust the strength of a digital watermark in areas of an image.

The model described above was used to calculate the visibility of a watermark added to an image. The visibility display map was used to iteratively adjust the watermark strength, until the required level of visibility was achieved across the whole image (see FIG. 3). This allows the maximum watermark signal strength for a given level of visibility to be inserted. If the visibility is not approximately constant across an image, the watermark strength will be limited to the strength at which one area of the image first exceeds the required visibility level (see FIG. 4, line 42). Less watermark signal is added in this case than if the visibility is approximately constant (see FIG. 4, dotted line 44).

Figure 5:
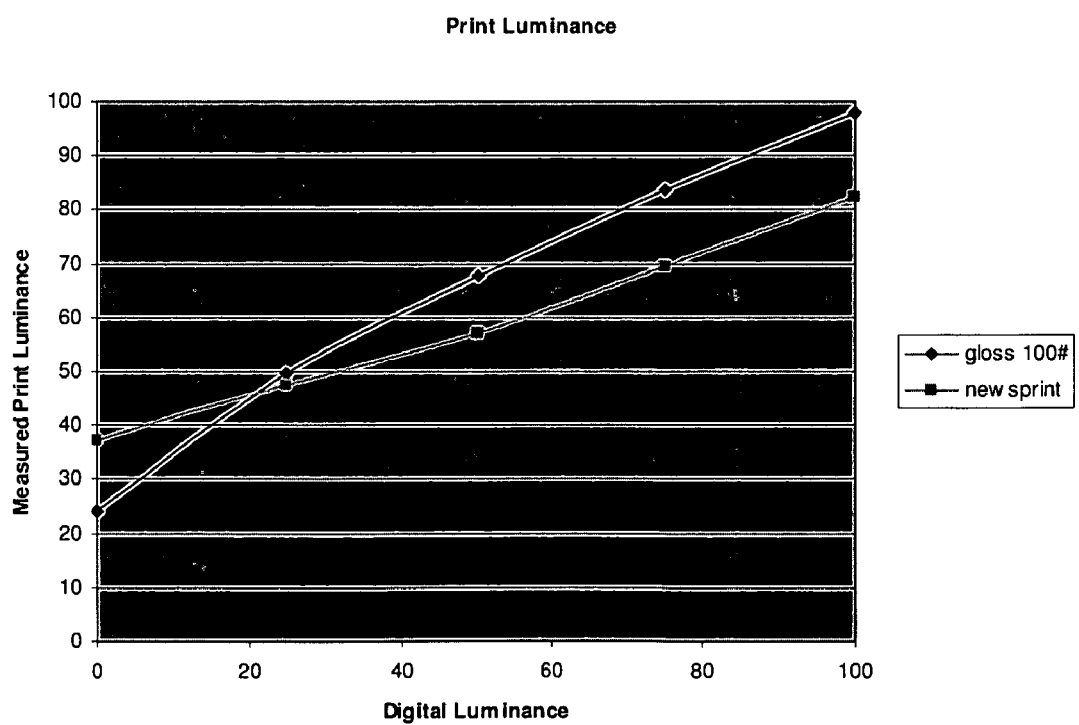
FIG. 5 is a plot illustrating measured print luminance vs. digital luminance for different rendering processes, namely printing on gloss paper vs. printing on newsprint.

The same model was used to calculate the visibility of a watermark (strength 1) added to an image which was then output to 100 pound gloss paper with a 150 line screen, compared to the same image output to newsprint with an 85 line screen. The visibility of the added watermark was predicted to be about 50% on the newsprint than on the 100 pound gloss paper. The paper stock has a large effect on the perceived image quality, due to the different tonal range and spatial resolution of the different paper stocks. The difference in tonal range for the different paper stock is shown in FIG. 5.

The appearance model was used to calculate the watermark signal level (strength 2) required to obtain approximately the same visibility on newsprint. The difference between the strength 2 watermarked image and reference image on newsprint was subjectively about the same, as the difference between the strength 1 watermarked image and the reference image printed on 100 pound gloss paper.

The color image appearance model we described has been used to obtain approximately equal watermark visibility across an image. The watermark signal strength has been corrected for images output on different types of paper stock, to obtain approximately the same visibility.

Controlling the watermark signal strength with this model, allows a more consistent signal level to be added to the image which takes into account the following factors:

a) image content
b) signal loss due to the paper stock and screen ruling.

The model we have described can be altered for other physical output processes such as screen display by replacing the 'Offset Print Model' component with a 'Screen Display Model'. Further, an attention model could also be used to determine areas within an image where a viewer's attention is most likely to be drawn. The results of the attention model can be used to generate a map indicating areas to adjust the watermark strength up or down to allow a stronger watermark signal to be placed in the areas where the viewer's attention is less likely drawn, such as background regions of an image.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
    obtaining data representing visual media;
    analyzing the data with a computing device to determine perceptibility attributes of the data, including applying a color image appearance model to the data to compute the perceptibility attributes based on visibility of color components within the data;
    varying a digital watermark signal relative to the data with reference to the perceptibility attributes, wherein varying comprises maintaining a predetermined perceptibility quality level of the visual media across the signal, and wherein the predetermined perceptibility quality level is based at least in part on the data;
    embedding the digital watermark signal in the data, wherein the digital watermark signal is varied so that modifications of the visual media to encode digital data of the digital watermark signal do not degrade the visual quality of the visual media signal beyond the predetermined perceptibility quality level.

2. The method of claim 1, wherein analyzing comprises converting the data representing visual media using color conversion.

3. The method of claim 2, wherein said analyzing further comprises performing a visibility metric analysis to compute perceptibility attribute areas within the data.

4. The method of claim 1, further comprising iteratively determining perceptibility attributes of the data after the embedding of the digital watermark signal.

5. The method of claim 4, wherein iteratively determining comprises creating a new embedding form or embedding mask after each embedding iteration.

6. A non-transitory computer-readable medium having instructions stored thereon, the instructions comprising:
    instructions to obtain data representing visual media;
    instructions to analyze the data to determine perceptibility attributes of the data, including applying a color image appearance model to the data to compute the perceptibility attributes based on visibility of color components within the data;
    instructions to vary a digital watermark signal relative to the data with reference to the perceptibility attributes, wherein varying comprises maintaining a predetermined perceptibility quality level of the visual media across the signal, and wherein the predetermined perceptibility quality level is based at least in part on the data; and
    instructions to embed the digital watermark signal in the data, wherein the digital watermark signal is varied so that modifications of the visual media to encode digital data of the digital watermark signal do not degrade the visual quality of the visual media signal beyond the predetermined perceptibility quality level.

7. The non-transitory computer readable medium of claim 6, further comprising:
    instructions to iteratively determine perceptibility attributes of the data after the digital watermark signal is embedded; and
    instructions to create a new embedding form or embedding mask after each iteration.

8. The method of claim 1, wherein varying comprises varying the digital watermark signal relative to the data with reference to both the perceptibility attributes and a model of an expected rendering device.

9. A method comprising:
    obtaining data representing visual media;
    determining, with a computing device, a model which maximizes robustness of a digital watermark signal while minimizing perceptibility of the digital watermark signal when the signal is embedded in the data, wherein determining the model includes computing visibility based on analysis of visibility of plural different color components of the visual media; and
    embedding the digital watermark signal in the data according to the model,
    wherein the model and a reference are used to adjust the digital watermark signal embedding in the different color components and maintain a visual quality of the visual media relative to a quality level, wherein the reference is based at least in part on the data.

10. The method of claim 9, wherein determining the model further comprises color converting the data.

11. The method of claim 9, wherein at least one of the robustness or perceptibility relies on color attributes of the data.

12. The method of claim 9, wherein determining the model further comprises iteratively embedding the digital watermark signal in the data.

13. The method of claim 12, further comprising creating a new embedding form or embedding mask after each embedding iteration.

14. A non-transitory computer-readable medium having instructions stored thereon, the instructions comprising:

instructions to obtain data representing visual media;
instructions to determine a model which maximizes robustness of a digital watermark signal while minimizing perceptibility of the digital watermark signal when the signal is embedded in the data, wherein the instructions to determine the model include instructions to compute visibility based on analysis of plural different color components of the visual media; and
instructions to embed the digital watermark signal in the data according to the model, wherein the model and a reference are used to adjust the digital watermark signal embedding in the different color components and maintain a visual quality of the visual media relative to a quality level, and wherein the reference is based at least in part on the data.

15. The non-transitory computer-readable medium of claim 14, wherein the instructions to determine the model further comprise instructions to iteratively embed the digital watermark signal in the data.

16. The non-transitory computer-readable medium of claim 15, further comprising instructions to embed a new embedding form or embedding mask after each embedding iteration.

17. The method of claim 9, wherein the model utilizes an approximation of an expected rendering device.

18. A method comprising:
obtaining data representing visual media;
determining, with a computing device, a model through iteratively embedding a digital watermark signal in the data, wherein the model maximizes robustness of the digital watermark signal while minimizing perceptibility of the digital watermark signal when the signal is embedded in the data, wherein, after each embedding iteration, a new embedding form or embedding mask is created based on analysis of visibility of plural different color components of the visual media with reference to the data; and
embedding the digital watermark signal in the data according to the model.

19. A non-transitory computer-readable medium having instructions stored thereon, the instructions comprising:
instructions to obtain data representing visual media;
instructions to determine a model through iteratively embedding a digital watermark signal in the data, wherein the model maximizes robustness of the digital watermark signal while minimizing perceptibility of the digital watermark signal when the signal is embedded in the data, wherein, after each embedding iteration, a new embedding form or embedding mask is created based on analysis of visibility of plural different color components of the visual media with reference to the data; and
instructions to embed the digital watermark signal in the data according to the model.

* * * * *

UNITED STATES PATENT AND TRADEMARK OFFICE
CERTIFICATE OF CORRECTION

PATENT NO. : 8,098,882 B2  
APPLICATION NO. : 12/057745  
DATED : January 17, 2012  
INVENTOR(S) : Reed et al.

Page 1 of 1

It is certified that error appears in the above-identified patent and that said Letters Patent is hereby corrected as shown below:

Title page, item (54), under "Title", in Column 1, Line 1, delete "PERCEPTABILITY" and insert -- PERCEPTIBILITY --.

Column 1, line 1 (in the Title), delete "PERCEPTABILITY" and insert -- PERCEPTIBILITY --.

Column 5, line 65, in Claim 3, delete "wherein said analyzing" and insert -- wherein analyzing --.

Column 6, line 28, in Claim 7, delete "computer readable" and insert -- computer-readable --.

Signed and Sealed this  
Third Day of July, 2012

David J. Kappos  
*Director of the United States Patent and Trademark Office*